March 8, 1938.  F. C. WAGNER  2,110,248

SYNCHRO-CROSS-EXPANSION ENGINE

Filed Oct. 17, 1934  4 Sheets-Sheet 1

INVENTOR
FRANK C. WAGNER.
BY Toulmin & Toulmin
ATTORNEYS

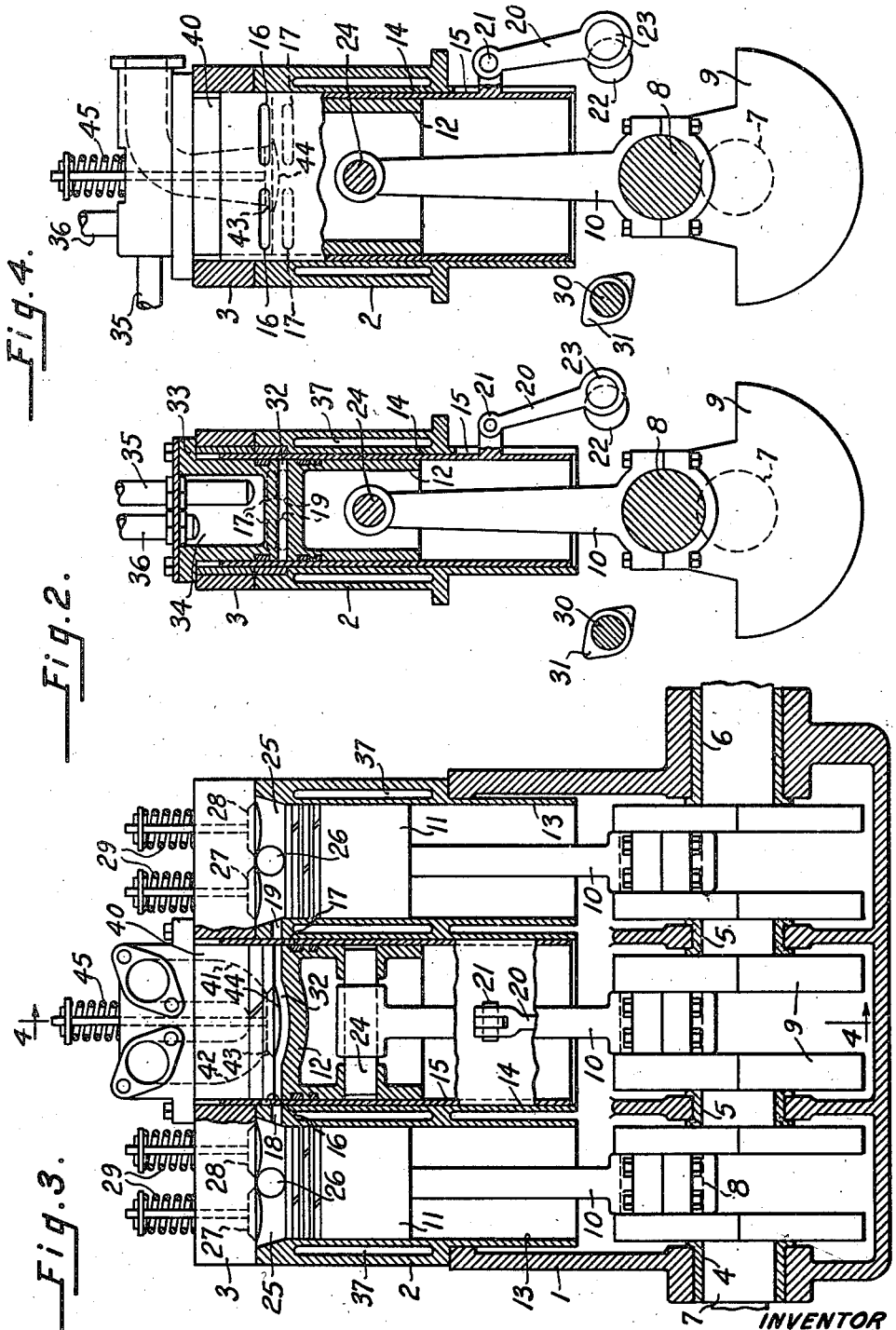

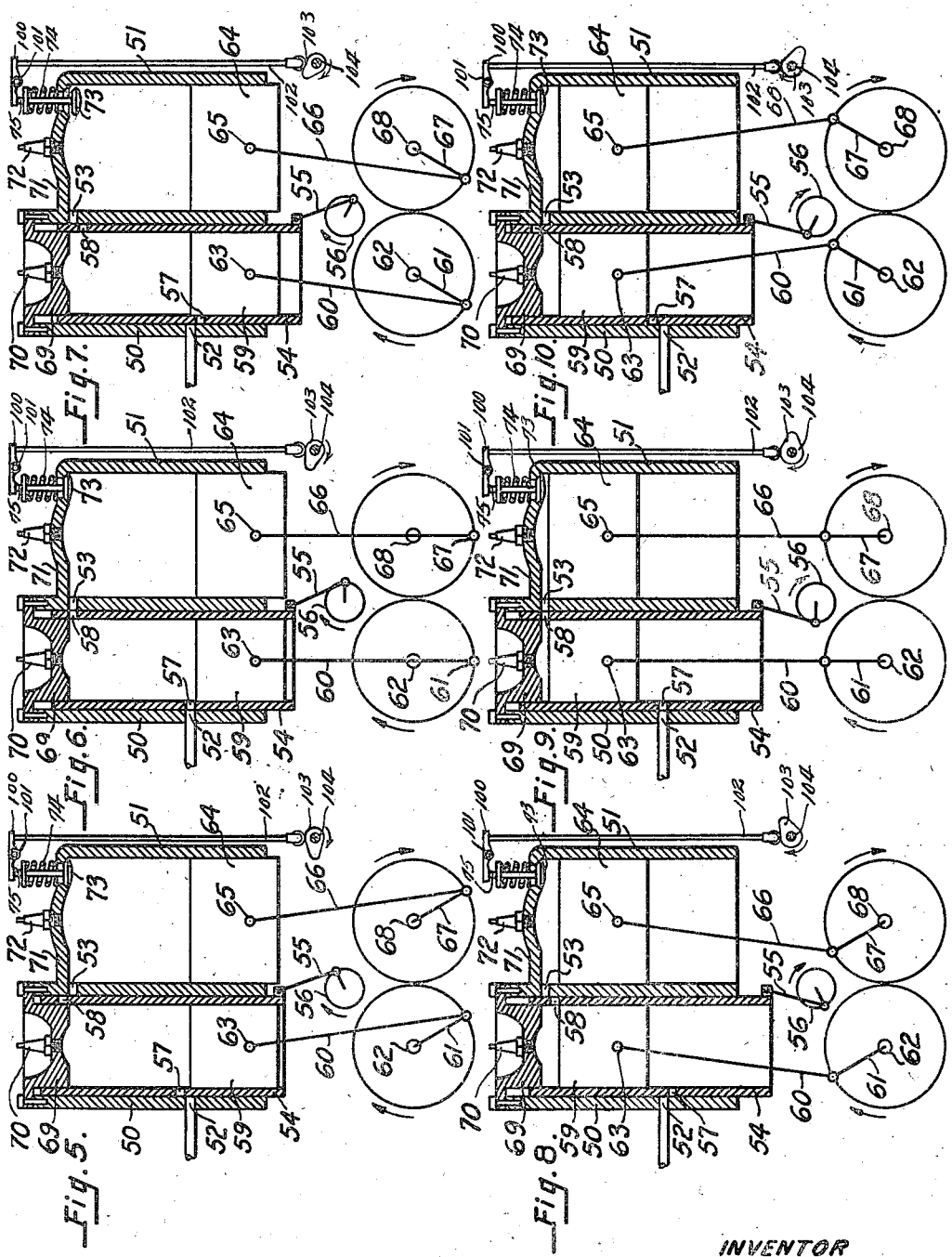

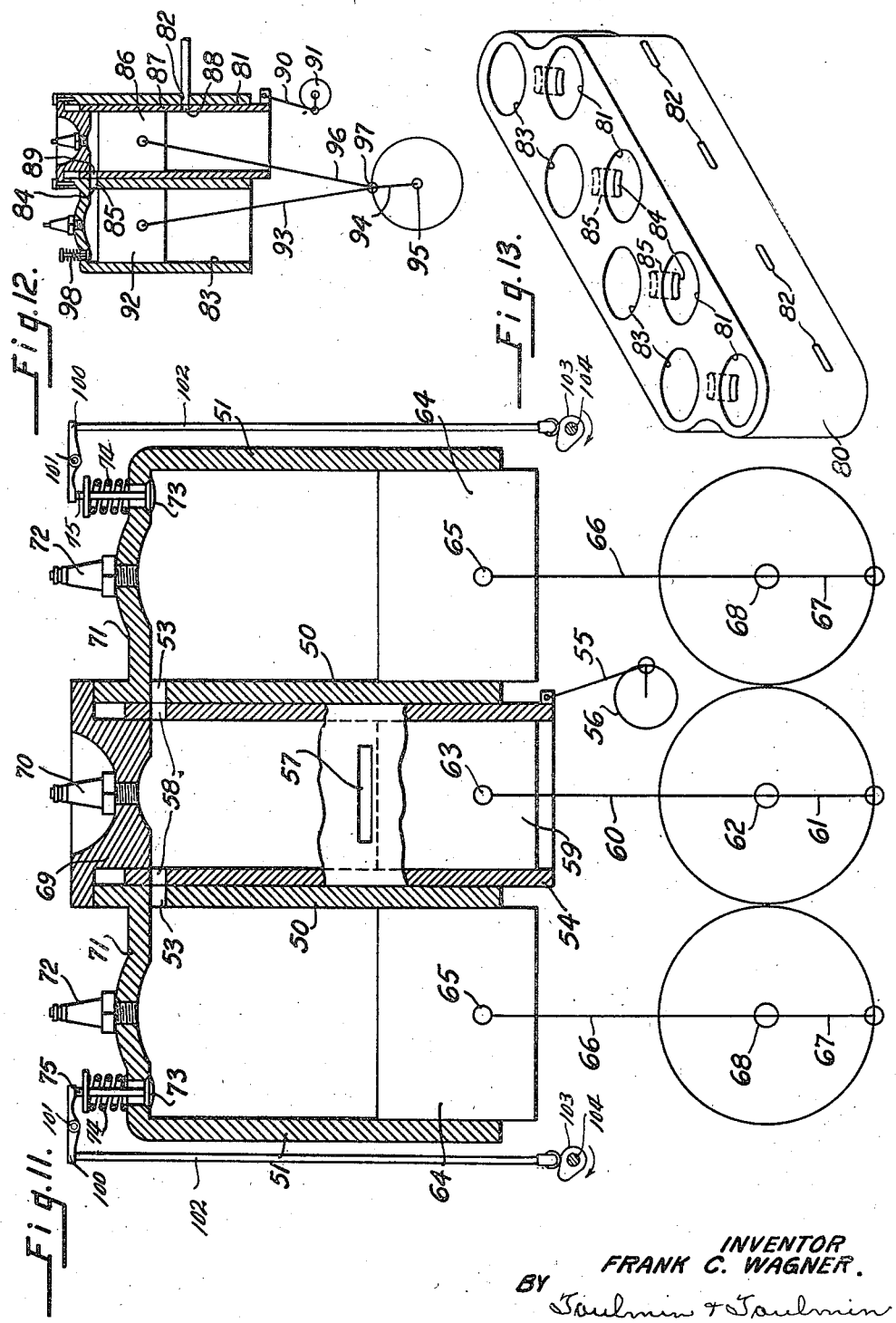

Patented Mar. 8, 1938

2,110,248

UNITED STATES PATENT OFFICE 2,110,248

SYNCHRO-CROSS-EXPANSION ENGINE

Frank C. Wagner, Corpus Christi, Tex., assignor of one-half to Vaughn A. Bradley, Corpus Christi, Tex.

Application October 17, 1934, Serial No. 748,671

6 Claims. (Cl. 123—53)

This invention relates to internal combustion engines and, in particular, to an internal combustion engine wherein the ratio of expansion is different from the ratio of compression.

One object of my invention is to provide an internal combustion engine having means for providing an increased expansion ratio as compared with the compression ratio of the engine, in order to increase the efficiency of the engine, decrease the cost of operation, and reduce the cooling and muffling requirements.

Another object is to provide an internal combustion engine having a power cylinder and an expansion cylinder communicating therewith and so arranged that the charge will be compressed in one cylinder but combustion will take place in both cylinders, the increased combustion space giving a greater expansion ratio than compression ratio.

Another object is to provide such an arrangement of power cylinders and expansion cylinders as may be used for two-cycle and four-cycle engines of the Otto and Diesel types.

Another object is to provide an internal combustion engine having a power cylinder and an expansion cylinder, the charge being compressed and ignited in the power cylinder, but immediately thereafter allowed to enter the expansion cylinder, the pistons of both cylinders being arranged in the same phase so that their cranks are in the same relative positions.

Another object is to provide a four-cycle internal combustion engine having a pair of power cylinders and an expansion cylinder, the power cylinders having a four-cycle arrangement, and the expansion cylinder a two-cycle one, so that the expansion cylinder serves each power cylinder alternately for expansion purposes, but takes no part in the compression of the gaseous charge, except when using certain methods of supercharging, as set forth herein.

Another object is to provide a method of generating power wherein a gaseous fluid is compressed in one enclosure and then allowed to expand simultaneously in this and another enclosure, the expansion ratio being thereby greater than the compression ratio.

Another object is to provide an internal combustion engine having a power cylinder and an expansion cylinder, the charge being compressed in the power cylinder nearly to completion, a portion of said charge being allowed to enter the expansion cylinder, but immediately after completion of compression, the charges being ignited in both the power and expansion cylinders, the pistons of both cylinders being arranged in the same phase so that their cranks are in the same relative positions.

Another object is to provide an internal combustion engine having a power cylinder and an expansion cylinder operating in the manner previously described, and arranged in offset positions, yet using a common crankshaft.

In the drawings:

Figure 2 is a transverse vertical section along the line 2—2 of Figure 1;

Figure 3 is a side elevation, partly in section, of a four-cycle internal combustion engine having an expansion cylinder with an area twice that of each power cylinder, so as to give a three-to-one ratio of expansion to compression, with gas transfer after ignition;

Figure 4 is a transverse vertical section along the line 4—4 of Figure 3;

Figure 1:
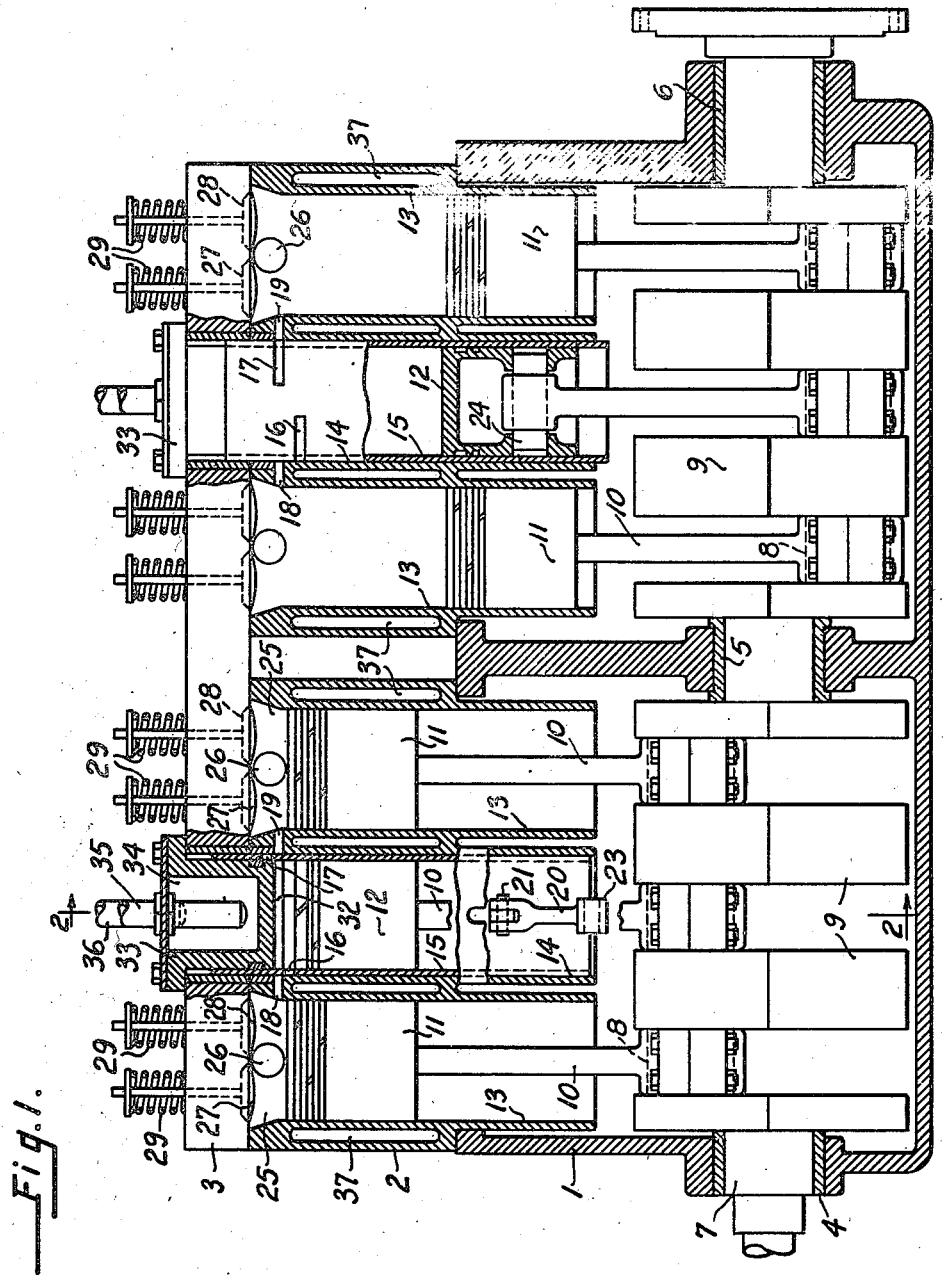
Figure 1 is a side elevation, partly in section, of a four-cycle internal combustion engine embodying the features of my invention, with gas transfer after ignition.

Figures 5 to 10 inclusive are diagrammatic views showing a two-cycle engine arranged according to my invention, and having its power cylinder and expansion cylinder at various stages in its cycle of operation, the gas transfer taking place before ignition;

Figure 11 shows a modified arrangement of the two-cycle type of engine with one power cylinder and two expansion cylinders;

Figure 12 shows a cross section through a modified arrangement of engine with the power cylinders and expansion cylinders arranged in offset or staggered positions, yet connected to a common crankshaft;

Figure 13 is a digrammatic perspective view of the cylinder block of the engine shown in Figure 12, with the cylinder head removed to disclose the arrangement more clearly.

*Four-cycle synchro-cross-expansion engine*

Referring to the drawings in detail, Figure 1 shows an internal combustion engine in diagrammatic form and having a crankcase 1 surmounted by a cylinder block 2 and capped by a cylinder head block 3. The crankcase 1 is provided with bearings 4, 5 and 6 which rotatably support the crankshaft 7 having the crank pins 8 and counterweights 9. Engaging the crank pins 8 are connecting rods 10. The opposite ends of the connecting rods 10 are attached to the pistons 11 and 12, the middle piston 12 having a piston 11 on each side thereof.

The cylinder bores are arranged in groups of three. The central cylinder bore 14 serves as an expansion cylinder adapted to serve the power cylinder bores 13 in alternate succession.

In order to provide this alternate service, the expansion cylinder bore 14 is provided with suitable valve means for that purpose, the valve means shown in Figure 1 consisting of a reciprocable sleeve 15 having ports 16 and 17 arranged therein and communicating by passages 18 and 19 with the lefthand and righthand cylinder bores 13 respectively. The sleeve valve 15 is reciprocated by any suitable means, such as by the connecting rod 20 pivotally attached to the sleeve as at 21 and engaging the eccentric shaft 22 as at 23 (Figures 1 and 2). The connecting rods 10 are joined to the piston heads 11 by means of the piston pins 24. (Figure 2.)

The expansion piston 12 is reciprocable within the sleeve 15. It will be observed that the crank pins 8 are in the same phase with one another for both the expansion and power cylinders of each group although the strokes thereof are not necessarily of the same length.

The combustion chambers 25 of the power cylinders 13 are provided with spark plugs 26 for igniting the charge when it is suitably compressed. These combustion chambers 25 are closed by the cylinder head 3 having the intake and exhaust valves 27 and 28 respectively. These valves are urged into their closed or seated positions by means of the coil springs 29, and are opened and closed in suitable timed relationship by means of a cam shaft 30 having cams 31 thereon.

The combustion chamber 32 of the expansion cylinders 14 is closed by the cylinder head blocks 33 having the water-cooling chambers 34 served by the intake and outlet conduits 35 and 36 respectively. Similarly, the various cylinders are cooled by the water jackets 37.

In the operation of the four-cycle engine shown in Figures 1 and 2, the fuel gas vapor is drawn into the power cylinder combustion chambers 25 by the opening of the inlet valves 27 and by the suction set up in the reciprocation of the power pistons 11.

As the power pistons 11 move upward on their return strokes with the inlet valves 27 closed, they compress the charge. When the pistons 11 near the tops of their strokes, so that the maximum compression of the charge has been substantially obtained, the spark plugs 26 are caused to pass sparks, igniting the compressed charges. Meanwhile the valve sleeve 15 has been raised by its connecting rod 20 until its port 16 opens into the passageway 18. The charge compressed and ignited in the lefthand power cylinder 13 then rushes into the expansion combustion space 32. The gases burn, forcing the pistons 11 and 12 downward and thus generating power.

As the pistons 11 and 12 reach the bottoms of their strokes, the gases become substantially completely burned, and the pistons then make their return strokes. At the proper time the exhaust valve 28 of the lefthand power cylinder 13 opens, releasing the exhaust gases from both the combustion spaces 25 and 32, the latter escaping by way of the port 16 and passageway 18.

Meanwhile the righthand piston 11 has drawn in a charge by way of the righthand inlet valve 27, and has compressed this charge in the righthand combustion space 25. The charge is then ignited by the righthand spark plug 26 as the righthand piston 11 nears the top of its stroke.

The valve sleeve 15 then opens again, causing the port 17 to become aligned with the passageway 19 (Figure 1). This permits the compressed and ignited gases to rush from the righthand combustion space 25 into the combustion space 32 of the expansion cylinders 14. As the gases burn, they force the righthand power piston 11 and the expansion piston 12 downward simultaneously, generating power and transmitting it to the crankshaft 7. On the return stroke, the righthand exhaust valve 28 opens and the pistons 11 and 12 force the burned gases outward therethrough, those from the piston 12 passing through the port 17 and the passage 19 into the combustion space 25.

Thus in the four-cycle engine arranged according to my invention, a single expansion cylinder alternately serves a pair of power cylinders. The expansion cylinder therefor carries out a two-stroke cycle of operation, whereas the power cylinders carry out four-stroke cycles.

The four-cycle engine shown in Figures 3 and 4 is generally similar in construction to that shown in Figures 1 and 2, and corresponding parts are given the same numerals. The expansion cylinder 14 is, however, provided with a combustion space 32 which is closed by the cylinder head block 40, having the dual exhaust passages 41 and 42 uniting in the common exhaust port 43. The latter is provided with the exhaust valve 44 urged into closed position by the coil spring 45. The expansion piston 12 of the engine shown in Figure 3 is, however, twice the area of the power pistons 11. This arrangement causes the engine to provide a three-to-one ratio of expansion to compression. In both engines the combustion space 32, when the expansion piston 12 is at the top of its stroke, is made as small as possible for safe mechanical operation. The combustion spaces 25 of the power cylinders 13, however, are made of the dimensions calculated according to the usual methods known to those skilled in the internal combustion engine art.

The cycle of operations of the engine shown in Figure 3 is similar to that of the engine shown in Figure 1, with the exception of the fact that the expansion chamber exhaust valve 44 assists in releasing the exhaust gases therefrom. The latter are not required to pass outward through the sleeve ports and cylinder head passageways, as is the case with engines shown in Figures 1 and 2. Otherwise the principles of operation of both engines are substantially the same.

*Two-cycle synchro-cross-expansion engine*

The invention as applied to a two-cycle engine is shown diagrammatically in Figures 5 to 10 inclusive. These figures illustrate the position of the various parts of the engine in various successive stages during a cycle of operation.

The two-cycle engine shown in Figures 5 to 10 inclusive consists of a power cylinder 50 and an expansion cylinder 51. The power cylinder 50 is provided with a lower port 52 and an upper port 53, the gases being regulated, with respect to these ports, by the sliding sleeve transfer valve member 54 reciprocated by the connecting rod 55 operated by the eccentric or cam shaft 56. The transfer valve sleeve 54 is provided with a lower port 57 and an upper port 58, these being arranged so as to be adapted to communicate with the power cylinder ports 52 and 53 respectively.

The power cylinder 50 is provided with a piston head 59 adapted to reciprocate to and fro within the valve sleeve 54, this reciprocation being communicated by the connecting rod 60 to the crank arm 61 of the crank shaft 62 from the piston pin 63. In a similar manner, the expansion cylinder 51 is provided with a piston head 64, from the piston pin 65 of which, power is communicated by the connecting rod 66 to the crank 67 of the crank shaft 68. The direction of rotation of the crank shafts 62 and 68, as well as that of the eccentric shaft 56, is indicated by the arrows.

The power cylinder 50 is provided with a cylinder head 69 having a spark plug 70 adapted to ignite the charge therein. The expansion cylinder 51 is similarly provided with a cylinder head 71 having a spark plug 72 and an exhaust valve 73 urged into closed position by the coil spring 74 and actuated by the valve stem 75 through suitable cam shaft connections consisting of the rocker arm 100 pivotally mounted at 101, the push rod 102, and the cam 103 on the cam shaft 104.

It will be observed that the cranks and pistons of the power and expansion cylinders 50 and 51 are in the same phase, so that they start their downward strokes in substantially the same positions. It is not necessary, however, that the lengths of the two strokes be the same. It will also be seen that at least one expansion cylinder is provided for each power cylinder in the two-cycle form of my engine, as contrasted with the four-cycle form, wherein one expansion cylinder serves two power cylinders.

The compressed gas may be transferred from the power cylinder 50 to the expansion cylinder 51, either just before or immediately after ignition. If the latter mode of operation is chosen, the transfer valve 54 is subjected to the hot combustion gases and accordingly the cooling and erosion might present a greater problem than if the compressed gas be transferred prior to or immediately at the time of ignition. If the gas is transferred before ignition, it has been found advisable to design the total combined clearance space of both the power and expansion cylinders, including the transfer passageway 53, so that the combined volume substantially equals the clearance required for the volume of the gas compressed in the power cylinder. The transfer valve 54 can then be opened ahead of the top center position of the pistons and before ignition. The valve port 58 and passageway 53 are then subjected merely to the temperature of compression rather than to the high temperature of combustion, and less erosion is likely to take place.

In the operation of the two-cycle synchro-cross-expansion engine of my invention, the cycle of operation proceeds as shown in Figures 5 to 10 inclusive. The power piston 59 and the expansion piston 64 move downward simultaneously under the influence of the burning gases in the power and expansion cylinders 50 and 51 (Figure 5). During this portion of the cycle, the sleeve valve member 54 is in such a position that its ports 57 and 58 are closed.

As the pistons 59 and 64 reach the bottoms of their strokes (Figure 6), the sleeve valve member 54 moves into such position that its ports 57 and 58 communicate with the passages 52 and 53. The exhaust gases rush outward through the port 58 and passage 53 into the expansion cylinder 51, thence passing out into the exhaust manifold by way of the exhaust valve 73, which is opened by its cam shaft at the proper moment.

The fresh charge of gas rushes in through the intake passage 52 and lower port 57, assisting in "scavenging" or pushing out the exhaust gases from the power cylinder 50.

The power piston 59 and the expansion piston 64 then move upward together (Figure 7), but the sleeve valve member 54 has meanwhile shifted, closing the communication between the power cylinder 50 and the expansion cylinder 51. During this portion of the stroke (Figures 7 and 8), the power piston 59 compresses the gaseous charge, whereas the expansion piston 64 pushes out through the exhaust valve 73 such part of the exhaust gases as may yet be present in the expansion cylinder. As the pistons near the tops of their strokes (Figure 8), the exhaust valve 73 closes and the sleeve transfer port 58 becomes ready to open into the passageway 53 between the power and expansion cylinders 50 and 51.

As the power and expansion pistons 59 and 64 reach the tops of their strokes (Figure 9), the sleeve valve member 54 shifts to bring the port 58 into alignment with the passage 53, thus permitting a portion of the compressed gases to pass into the expansion cylinder 51. The spark timing and distributing mechanism then operates to pass a spark across the electrodes of the spark plugs 70 and 72, igniting the charge. Under the impulse of the expanding and burning gases, the power and expansion pistons 59 and 64 are pushed downward (Figures 10 and 5), and the sleeve valve member 54 again shifts to close the ports between the two cylinders. The pistons then move downward until they again reach the positions shown in Figure 5, repeating the cycle.

The spark timing and valve opening may obviously be changed by adjusting the timing mechanism and eccentric shaft 56, so as to permit the compressed gases to pass from the power cylinder 50 into the expansion cylinder 51 just prior to ignition.

The relative sizes of the cross-expansion and power cylinders can be varied as desired. These sizes are determined by mechanical considerations as well as by the extent to which it is desired to increase the expansion ratio over the compression ratio.

Thus it will be seen that I have provided an internal combustion engine which gives an increased expansion ratio as compared with the compression ratio by compressing a charge in one cylinder and then, after ignition, expanding it simultaneously in this cylinder as well as in an adjacent cylinder or cylinders whose pistons are positioned for an expansion stroke. By arranging transfer valves between these cylinders, I have provided for the proper distribution of the charge at the proper point of time. By thus providing an increased expansion ratio as compared with the compression ratio, I obtain an increased efficiency as compared with the efficiency of the Otto cycle. The efficiency of the latter, according to the well-known principles of thermo-dynamics, is limited by the ratio of compression, since the ratio of expansion in the Otto cycle is the same as the ratio of compression.

It will be understood, however, that my invention is not a "compound" engine, as the term is ordinarily used. In compound engines the cylinders are arranged in "series" and the charge is expanded, after ignition, in one cylinder, after which it is transferred to finish its expansion in other cylinders. In compound engines, furthermore, the pistons and cranks are not in the same phase, but are necessarily in different phase relationships with one another. In my engine, in contrast, the gaseous charge is compressed in one cylinder and then simultaneously expanded in this and other cylinders having their pistons and cranks in the same phase relationship.

While I have illustrated and described my invention as applied to internal combustion engines having cranks, it will be understood that the same principles may be applied to the so-called "crankless" types of engines with the proper phase relationships carried out as previously disclosed herein.

A modified form of two-cycle engine, according to my invention, is shown in Figure 11. In this embodiment thereof, a single power cylinder 50 is made to serve two expansion cylinders 51. The power cylinder 50 contains the sleeve valve member 54 having the ports 57 and 58, and is actuated by the connecting rod 55 from the eccentric 56. The operation of this form is analogous to that of the forms already described, and follows the principles of Figures 5 to 10 inclusive, hence requires no further discussion.

Another modified form of engine, according to my invention, is shown in Figures 12 and 13. In this engine the cylinders are in offset or staggered positions, but are connected to a common crankshaft. This engine has a cylinder block 80 with power cylinder bores 81 and inlet ports 82 for the admission of the fuel mixture. Leading from the top of the power cylinder bores to the expansion cylinder bores 83 are transfer ports 84 and transfer passages 85.

Reciprocating in the power cylinders 81 are power pistons 86 surrounded by a sleeve valve member 87. The latter is provided with ports 88 and 89 adapted to cooperate with the inlet ports 82 and the transfer ports 84. The sleeve valve 87 is actuated by the connecting rod 90 engaged by the eccentric 91. The expansion cylinders 83 also contain expansion pistons 92 connected by the connecting rods 93 to the crank arm 94 of the crankshaft 95. The power pistons 86 are similarly connected by the connecting rods 96 to the crank pins 97 of the crankshaft 95. The expansion cylinders 83 are provided with exhaust valves 98 operating in the manner previously described in connection with Figures 5 to 10 inclusive.

It will be seen from Figures 12 and 13 that each power piston 86 and its expansion piston 92 reciprocate in the same phase, that is, they reach the tops and bottoms of their strokes at approximately the same times. Their connections to the crankshaft, however, are not necessarily in the same phase relationships, since the cylinders are staggered. It is understood, therefore, that when the words "same phase relationship" are used, they mean that the tops of each power piston and its corresponding expansion piston at the tops and bottoms of their strokes are approximately on the same level. It does not mean that all of the power pistons and all of the expansion pistons shall be in the same phase relationships at the same time. It is obvious that in a V-type of engine, the various power pistons and expansion pistons would not obey this condition of having the same phase relationships simultaneously, but the same principles, of course, apply.

It will also be understood that the crank angles resulting from having cylinders in offset positions may be changed a few degrees without materially affecting the piston travel at the extreme ends of the stroke.

It will be understood that I desire to comprehend within my invention such modifications as may be necessary to adapt it to varying conditions and uses.

Having thus fully described my invention, what I claim as new and desire to secure by Letters Patent is:

1. In an internal combustion engine, an expansion cylinder, a power cylinder, pistons for said cylinders, timed means for igniting charges of explosive gas in said cylinders at predetermined times, an intake valve for said power cylinder, and a transfer valve between said expansion cylinder and said power cylinder, said intake valve and said transfer valve being connected to admit gas to said expansion cylinder solely by way of said power cylinder, and mechanism for operating said transfer valve in timed relationship with the motion of said pistons and arranged to transfer gas from said power cylinder to said expansion cylinder solely near the end of the compression stroke of said power cylinder.

2. In an internal combustion engine, an expansion cylinder, a power cylinder, pistons for said cylinders, timed means for igniting charges of explosive gas in said cylinders at predetermined times, an intake valve for said power cylinder, a transfer valve between said expansion cylinder and said power cylinder, said intake valve and said transfer valve being connected to admit gas to said expansion cylinder solely by way of said power cylinder, and transfer valve-operating devices arranged and timed to operate said transfer valve to pass gas therethrough from said power cylinder to said expansion cylinder solely near the end of the compression stroke of said engine and prior to the operation of said igniting means and the ignition of said gas.

3. In an internal combustion engine, an expansion cylinder, a power cylinder, pistons for said cylinders, timed means for igniting charges of explosive gas in said cylinders at predetermined times, an intake valve for said power cylinder, a transfer valve between said expansion cylinder and said power cylinder, said intake valve and said transfer valve being connected to admit gas to said expansion cylinder solely by way of said power cylinder, and transfer valve-operating devices arranged and timed to maintain said transfer valve closed substantially throughout the compression stroke and to open said transfer valve substantially at the end of the compression stroke and prior to the operation of said igniting means and the ignition of said gas.

4. In an internal combustion engine, an expansion cylinder, a power cylinder, pistons for said cylinders, timed means for igniting charges of explosive gas in said cylinders at predetermined times, an intake valve for said power cylinder, a transfer valve between said expansion cylinder and said power cylinder, said intake valve and said transfer valve being connected to admit gas to said expansion cylinder solely by way of said power cylinder, and transfer valve-operating devices arranged and timed to maintain said transfer valve closed substantially throughout the compression stroke and to maintain said transfer valve open solely throughout the expansion stroke and prior to the operation of said igniting means and the ignition of said gas.

5. In an internal combustion engine, an expansion cylinder, a pair of power cylinders for each expansion cylinder, timed means for igniting charges of explosive gas in said cylinders at predetermined times, pistons for said cylinders, intake valves for said power cylinders, and transfer valve means arranged between said expansion cylinder and said power cylinders, mechanism for operating said transfer valve means in timed relationship with the motion of said pistons and arranged to transfer gas from said power cylinders to said expansion cylinder solely near the end of the compression stroke of said engine and prior to the operation of said igniting means and the ignition of said gas, said intake valves and said transfer means being connected to admit gas to said expansion cylinder solely by way of said power cylinder.

6. In an internal combustion engine, an expansion cylinder, a power cylinder, pistons for said cylinders, timed means for igniting charges of explosive gas in said cylinders at predetermined times, said power cylinder having an intake port near the lower limit of motion of its piston, a transfer valve between said expansion cylinder and said power cylinder, said expansion cylinder being arranged to receive gas solely by way of the said power cylinder, and mechanism for operating said transfer valve in timed relationship with the motion of said pistons and arranged to transfer gas from said power cylinder to said expansion cylinder solely near the end of the compression stroke of said power cylinder.

FRANK C. WAGNER.